US 9,143,480 B2

(12) United States Patent
Brousseau et al.

(10) Patent No.: US 9,143,480 B2
(45) Date of Patent: Sep. 22, 2015

(54) ENCRYPTED VPN CONNECTION

(75) Inventors: William Reynolds Brousseau, Glendale, WI (US); Kenneth Robert Walker, Riverside, CA (US); Henry Goldberg, Irvine, CA (US)

(73) Assignee: Secure Global Solutions, LLC, Irvine, CA (US)

(*) Notice: Subject to any disclaimer, the term of this patent is extended or adjusted under 35 U.S.C. 154(b) by 49 days.

(21) Appl. No.: 13/345,515

(22) Filed: Jan. 6, 2012

(65) Prior Publication Data
US 2012/0179831 A1 Jul. 12, 2012

Related U.S. Application Data

(60) Provisional application No. 61/431,276, filed on Jan. 10, 2011.

(51) Int. Cl.
H04L 12/931 (2013.01)
H04L 29/06 (2006.01)
H04L 29/12 (2006.01)

(52) U.S. Cl.
CPC .......... *H04L 63/0272* (2013.01); *H04L 49/354* (2013.01); *H04L 61/256* (2013.01)

(58) Field of Classification Search
CPC .............. H04L 49/354; H04L 63/0272; H04L 61/2585
USPC .......................................... 709/228, 222, 227
See application file for complete search history.

(56) References Cited

U.S. PATENT DOCUMENTS

| | | | | |
|---|---|---|---|---|
| 5,974,453 | A * | 10/1999 | Andersen et al. | 709/220 |
| 6,954,790 | B2 * | 10/2005 | Forslow | 709/227 |
| 7,260,648 | B2 * | 8/2007 | Tingley et al. | 709/245 |
| 7,353,280 | B2 * | 4/2008 | Chiles et al. | 709/228 |
| 7,751,391 | B2 * | 7/2010 | Boden et al. | 370/389 |
| 7,814,541 | B1 * | 10/2010 | Manvi | 726/15 |
| 7,844,718 | B2 * | 11/2010 | Polcha et al. | 709/229 |
| 7,920,561 | B2 * | 4/2011 | Gonda | 370/389 |
| 7,965,701 | B1 * | 6/2011 | Toennis et al. | 370/352 |
| 8,019,837 | B2 * | 9/2011 | Kannan et al. | 709/220 |
| 8,085,695 | B2 * | 12/2011 | Kushalnagar et al. | 370/310 |
| 8,155,131 | B2 * | 4/2012 | Yan et al. | 370/401 |
| 8,984,141 | B2 * | 3/2015 | Ishida | 709/227 |
| 2002/0069278 | A1 * | 6/2002 | Forslow | 709/225 |
| 2002/0138628 | A1 * | 9/2002 | Tingley et al. | 709/227 |
| 2004/0109447 | A1 * | 6/2004 | Douglass et al. | 370/389 |
| 2004/0133689 | A1 * | 7/2004 | Vasisht | 709/228 |
| 2004/0162992 | A1 * | 8/2004 | Sami et al. | 713/200 |
| 2004/0204086 | A1 * | 10/2004 | Choi et al. | 455/557 |
| 2007/0081530 | A1 * | 4/2007 | Nomura et al. | 370/389 |
| 2008/0037557 | A1 * | 2/2008 | Fujita et al. | 370/395.53 |
| 2008/0201486 | A1 * | 8/2008 | Hsu et al. | 709/238 |
| 2008/0263654 | A1 * | 10/2008 | Bahl et al. | 726/15 |

(Continued)

*Primary Examiner* — Eleni Shiferaw
*Assistant Examiner* — Nelson Giddins
(74) *Attorney, Agent, or Firm* — Rutan & Tucker LLP; Hani Z. Sayed

(57) ABSTRACT

A method, apparatus, and system are described that provides fully automated network access to remote networked devices. The device and system permits the remote access of a local network without any pre-configuration or administrative burden at the local network. Embodiments as described herein provide a "plug and play" option to insert a device into the local network and provide access to select target devices on the network, even non-routable devices, without first requiring dedicated host software or other administrative privileges or configurations be set at the local network.

17 Claims, 6 Drawing Sheets

(56) References Cited

U.S. PATENT DOCUMENTS

| | | | |
|---|---|---|---|
| 2009/0059940 A1* | 3/2009 | Sultan | 370/401 |
| 2009/0245266 A1* | 10/2009 | Cho et al. | 370/401 |
| 2009/0304009 A1* | 12/2009 | Kolhi et al. | 370/400 |
| 2009/0313361 A1* | 12/2009 | Chan et al. | 709/222 |
| 2009/0323718 A1* | 12/2009 | Oren-Dahan | 370/466 |
| 2010/0054250 A1* | 3/2010 | Kitamura et al. | 370/392 |
| 2010/0192202 A1* | 7/2010 | Ker | 726/4 |
| 2010/0217874 A1* | 8/2010 | Anantharaman et al. | 709/228 |
| 2010/0235481 A1* | 9/2010 | Deutsch et al. | 709/222 |
| 2010/0322252 A1* | 12/2010 | Suganthi et al. | 370/395.53 |
| 2011/0138058 A1* | 6/2011 | Ishida | 709/227 |
| 2012/0185563 A1* | 7/2012 | Sugiyama et al. | 709/217 |
| 2013/0022051 A1* | 1/2013 | Suganthi et al. | 370/400 |
| 2013/0179580 A1* | 7/2013 | Short et al. | 709/227 |
| 2013/0311663 A1* | 11/2013 | Kamath et al. | 709/227 |
| 2014/0019639 A1* | 1/2014 | Ueno | 709/238 |
| 2014/0207958 A1* | 7/2014 | Tan et al. | 709/227 |
| 2015/0023352 A1* | 1/2015 | Yang et al. | 370/392 |

* cited by examiner

Customer Administration:

| Name | Active | Account Code | Code Key | Action |
|---|---|---|---|---|
| Customer 1 | Yes/No | 1 | xxx | Delete/Edit |

Hardware Controller Administration:

| Customer | ID | Host | Description | Action |
|---|---|---|---|---|
| Client 1 | CLIENT01 | client.com | Client TX | Delete/Edit |

Hardware Administration:

| MAC | Controller | Customer | VPN | Monitor | Action |
|---|---|---|---|---|---|
| Client 1 | CLIENT001 | Client 1 | Yes/No | Yes/No | Delete/Edit |

FIG. 5A

Hardware Controller Administration:

| Controller ID: | CLIENT001 |
|---|---|
| Code Key | xxx |
| Master Site 1 | IP_Address_1 |
| Master Site 2 | IP_Address_2 |
| External VPN Host Name | navigator.client.com |
| Base Navigator Network | IP_Address_3 |
| Class B NAT Network | IP_Address_4 |
| Active Controller | Yes/No |
| Controller Mate IP | 0.0.0.0 |
| Action | Edit |

Hardware Edit:

| MAC | MAC address |
|---|---|
| Enable | YES |
| Customer | CLIENT001 |
| Group | Team1 |
| Location | TX |
| Contact | Mike |
| Local Address | IP Address |
| DHCP | Yes |
| Navigator VPN Address | IP Address |
| VPN Subnet | IP Address |
| Number of Hosts | 126 |

Hardware Configuration:

| MAC | Enable | Customer | Location | Contact | Version | Action |
|---|---|---|---|---|---|---|
| MAC address | Yes/No | CLIENT001 | TX | Mike | 1.1 | Delete/Edit |

Group Administration:

| Group Name | Assigned Users | Action |
|---|---|---|
| Team1 | TEAM1 | Delete |

User Administration:

| User Name | Group | Admin | Last Login | Action |
|---|---|---|---|---|
| Mike | Team1 | Yes/No | Yes/No | Delete/Edit |

NAT Table:

| NAT IP | Real IP | Description |
|---|---|---|
| | | |

FIG. 5B

ENCRYPTED VPN CONNECTION

RELATED APPLICATIONS

This application claims the benefit of U.S. Provisional Patent Application No. 61/431,276 filed on Jan. 10, 2011, entitled "SGS Plug Pilot," incorporated in its entirety herein by reference.

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD OF THE INVENTION

Embodiments of the invention generally relate to network devices. More particularly, an aspect of an embodiment of the invention relates to access to and from networked devices.

BACKGROUND OF THE INVENTION

A local area network ("LAN") permits the interconnection of computers in a local or limited area. For example, an office or work site may create a computer network that interconnects computers, printers, scanners, and other resources to a single network to provide access by multiple users. The Internet is a large collection of networks that interconnects computers over a larger geographic area. The Internet uses the protocols TCP/IP suite to allow devices on one network to automatically communicate with other devices that may be on the same or remote networks. Each such device is assigned an IP address for each active network interface, which allows network infrastructure components to automatically route traffic between target devices.

Generally, in order to access one device across a network or internet, each available device must be assigned a unique internet protocol ("IP") address to identify the target device. If an address is not unique, the addresses are referred to as non-routable addresses because it is not possible to establish a route (that is, a path through a set of network infrastructure devices) such that traffic from a device on the local network may reach a network interface with the non-routable address on a remote network. This is very common when installing a unique device on a network that automatically assigned an IP address during the installation process. If an administrator just chooses the automatically assigned address, then the same device on different networks will be addressed the same. If more than one network containing this same device is then connected, the two devices are non-routable since their addresses are no longer unique. Alternatively, a target device may be assigned the same IP address as another device if contained in separate private networks, to alleviate the shortage of unique IP addresses available. Such private IP addresses are similarly non-routable if the private networks are later connected. Such non-routable IP addresses lead to greater complexity as administrators seek alternative mechanisms to provide access to remote devices without routable addresses.

Another concern presented by connecting one or more networks through the Internet is the security threat involved. Network administrators may seek to limit access to specific devices on a local network, while still providing remote access to other devices. A network administrator may limit access by developing and deploying network filtering devices or applications that allow them to specify specific address and port combinations that are granted or denied access to or from the remote connection. Although these techniques help reduce security threats, they increase complexity and cost to administrators desiring seamless access to networked devices.

To provide access to or between more than one network that may include the problems identified above, a dedicated device or client software may be installed on the local network that functions as a networked device. This dedicated device or software then acts as a host, assigned with a unique IP address, that all traffic to and from the remote network is automatically routed through the dedicated device or client. However, such a system is generally administratively complex and first requires an administrator to set up the devices on either network, before a connection may be created. Specialized software and/or hardware must be installed at the local network and possibly on each device given access to the remote connection through the dedicated device. Other considerations, such as security credentials must be set and maintained. Accordingly, a significant administrative burden is required to initialize and maintain such a remote system.

Given these challenges, there exists a need for a mechanism to allow simplified and automated access to remote devices using non-routable addresses without the use of dedicated host software and without requiring network administrator privileges on the remote network to set up, maintain or operate the solution.

SUMMARY OF THE INVENTION

A method, apparatus, and system are described that provides fully automated network access to remote networked devices. The device and system permits the remote access of a local network without any pre-configuration or administrative burden at the local network. Embodiments as described herein provide a "plug and play" option to insert a device into the local network and provide access to select target devices on the network, even non-routable devices, without first requiring dedicated host software or other administrative privileges or configurations be set at the local network.

Embodiments as described herein may be applied to a virtual private network ("VPN"). The device and system may utilize a VPN tunnel call-back to initiate and configure the connection, thus alleviating the need for administrative overhead at the local network. Embodiments may also utilize low overhead and low bandwidth while maintaining high security. For example, encryption and secure tunneling may be employed to provide network security to the local network. Embodiments may also include a plug and play device located at the local network in conjunction with a remote server to permit the connection of multiple devices of one network to multiple devices from another network. The system and device may also permit the point to point connection between two separate devices. Embodiments of the system may also utilize network address translation ("NAT") to handle conflict addressing on the local network of non-routable addresses.

BRIEF DESCRIPTION OF THE DRAWINGS

The drawings refer to embodiments of the invention in which:

FIG. 5A-B illustrates one or more application interfaces that permit a user to set desired control parameters for the local network connected through the hardware device.

Figure 1:
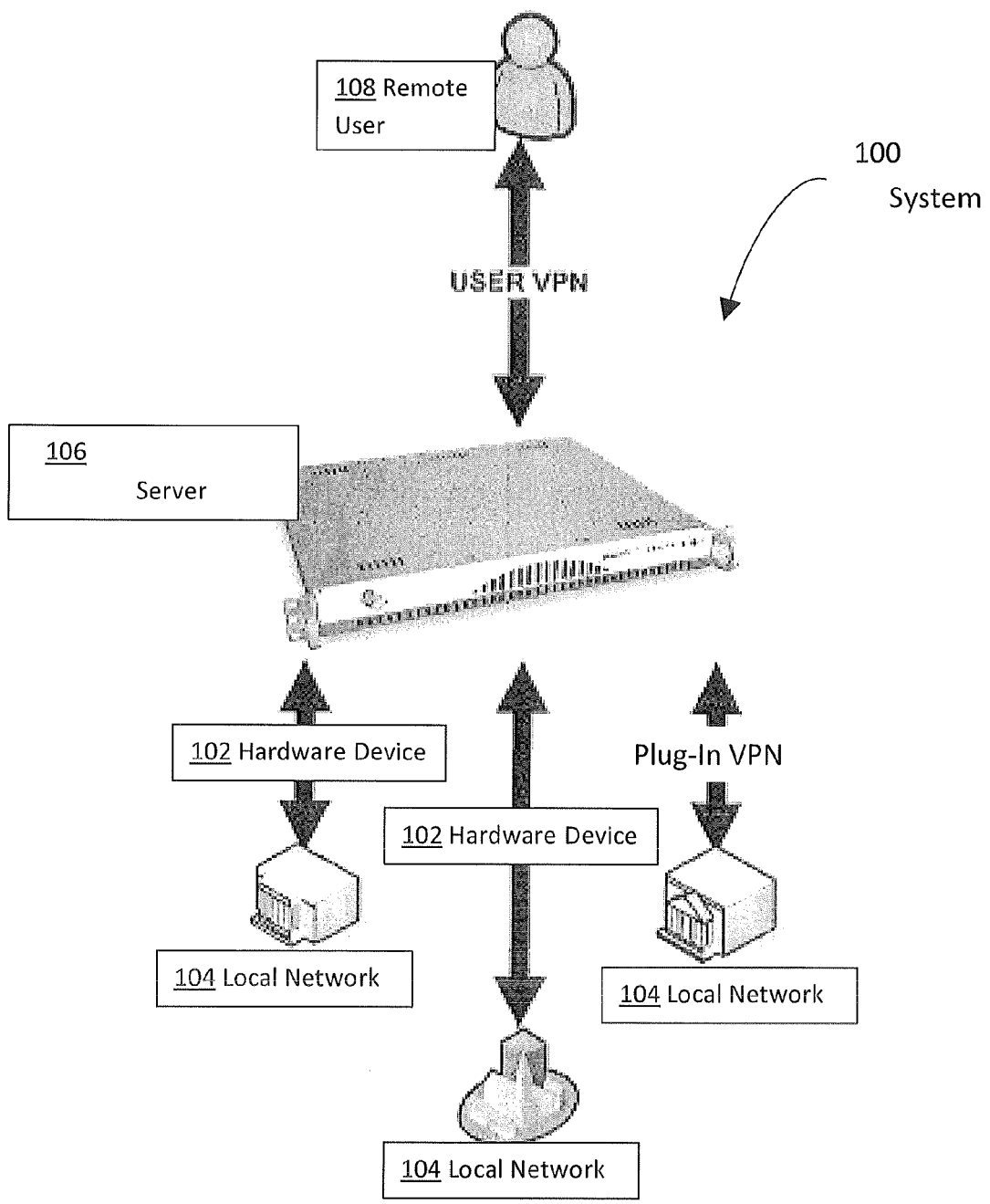
FIG. 1 illustrates an embodiment of a system to access multiple local networks on a remote user through a server.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, networks, etc., in order to provide a thorough understanding of the present invention. It will be apparent, however, to one of ordinary skill in the art that the present invention may be practiced without these specific details. In other instances, well-known components or methods have not been described in detail but rather in a block diagram in order to avoid unnecessarily obscuring the present invention. Further specific numeric references such as first network, may be made. However, the specific numeric reference should not be interpreted as a literal sequential order but rather interpreted that the first network is different than a second network. Thus, the specific details set forth are merely exemplary. The specific details may be varied from and still be contemplated to be within the spirit and scope of the present invention.

In general, various methods, and apparatuses are described that provide a system to access devices on a local network using a simple plug-in device at the local network without the need of administrative overhead at the local site. However, the invention is not so limited to a separate plug-in device. Embodiments as described herein including for the hardware device and/or server may be incorporated into one or more other hardware devices. The device may be incorporated into a local network to provide access to the device itself as well as other devices on the network. Alternatively, embodiments of the hardware device described herein may be incorporated into a device to provide remote access to a user connected to a network or directly to the internet.

The system generally utilizes a local plug-in device that is remotely followed by a server to permit multiple devices on multiple local networks to connect to other multiple users (many-to-many connection). The local plug-in device utilizes a call-back to create a virtual private network ("VPN") tunnel with the remote server. Once the plug-in device is powered and connected to a local network or device, it may initiate a VPN to a home IP address associated with a server. Encryption may be overlaid to create a secure tunnel back to the local network. Once the tunnel is created, a remote user may remotely access the server and then any device made available through the plug-in device at the local network. The server provides a remote administrator various monitoring and set-up options, such as network address translations ("NAT") to remotely handle the overlay of virtual addressing on otherwise non-accessible target devices.

In one embodiment, a VPN connection is established from any location to a controlling location using a network attached device at the local premise accessing the internet over Port 443. A network attached device may be a hardware device installed at a location that may use Dynamic Host Configuration Protocol ("DHCP") to obtain an Internet Protocol ("IP") address and is connected over port 443 to an outside address designed in the physical device. The tunnel is established with Secure Web (HTTPS) and other service options to create an encrypted VPN.

FIG. 1 illustrates an embodiment of a system to access multiple local networks of a remote user through a server. A hardware device 102 may be installed at a local network 104. The local network 104 may consist of a single computer or device or may be a network of devices that is contained within a building or area. Once connected to the network 104, the hardware device 102 creates a VPN tunnel to a server 106. A remote user 108 may then access the server 106 through a second VPN. The first and the second VPNs permit the user remote access to the devices on the local network 104. As illustrated in FIG. 1, one or more local networks may utilize one or more hardware devices to create one or multiple VPNs connected to the server 106. Server 106 may provide virtual addressing to provide access to multiple devices at multiple locations, even if the locations all have identical IP address schemes. The system 100 provides connection to field sites with a tool that will improve security, assure a quality connection and reduce costs.

Figure 2:
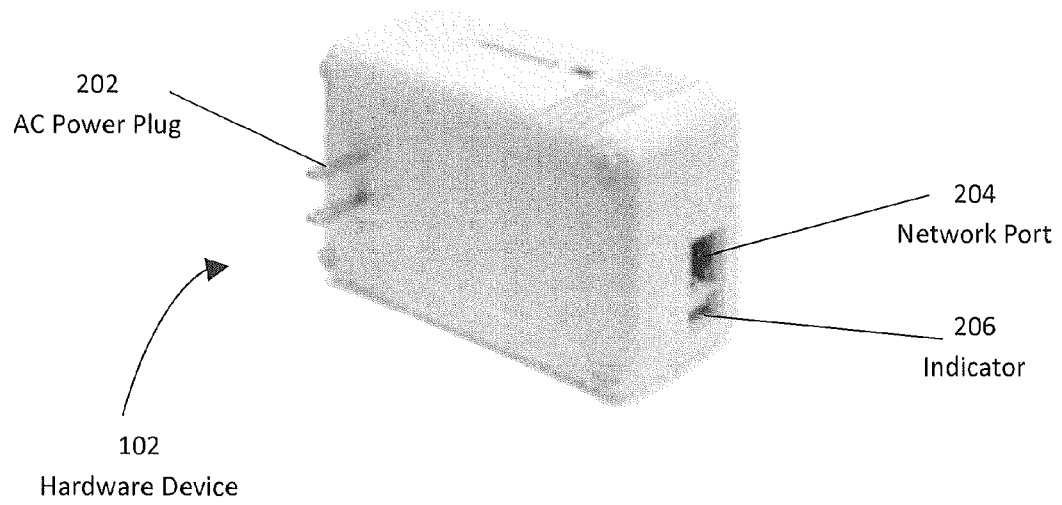
FIG. 2 illustrates an embodiment of a hardware device to connect to local networks.

The hardware device 102 provides a low-cost, high security, reliable VPN that is "plug-and-play." The hardware device 102 is connected to a local network 104 and provides a miniaturized PC to create a VPN to a remote server. As illustrated in FIG. 2, hardware device 102 may include a power source and network connection capability. The hardware device 102 may include security features through software or hardware to prevent tampering or attempted hacking, such that the device will not work or initiate if modified.

Referring to FIG. 2, the hardware device 102 includes an AC Power Plug 202 to plug into a wall outlet. The AC Power Plug 202 provides power to the plug-in hardware device 102. The hardware device 102 may also include a network port 204 to connect the device to a device or network. The hardware device 102 may also include one or more indicators (not shown), to indicate the status of the device. The indicator (not shown), for example, may be an LED that flashes at a set rate or at a specified color depending on the status of the device, e.g. initializing, transmitting, receiving, idle, or not connected.

The device may also include a secondary port 206 to provide alternate connectivity to the hardware device 102. For example, secondary port 206 may be a USB port used to connect to non-network technology including communication technologies such as GSM. Such connectivity may be used when there is no Internet connection or as a secondary communications path.

In an exemplary embodiment, the hardware device 102 may be compact for easy delivery and installation at a local network site. The hardware device 102 may include a PC, such as a 102 GHz CPU running a high performance Linux kernel with 1 GB memory and network access through a gigabit Ethernet port. The hardware device 102 may be powered from a 2-prong standard 115V wall socket. The compact physical device brings a powerful computer in a great low cost package.

The hardware device 102 may include an additional or alternative power source, network connection capabilities, or indicators. For example, a battery or other DC power source may be included in addition to or as an alternative to the AC power source. One or more ports may be included to provide various network connections to the device. Other wired or wireless connections may be included or utilized separately or in combination to provide the hardware device access to the local network or to another device.

Figures 3A, 3B:
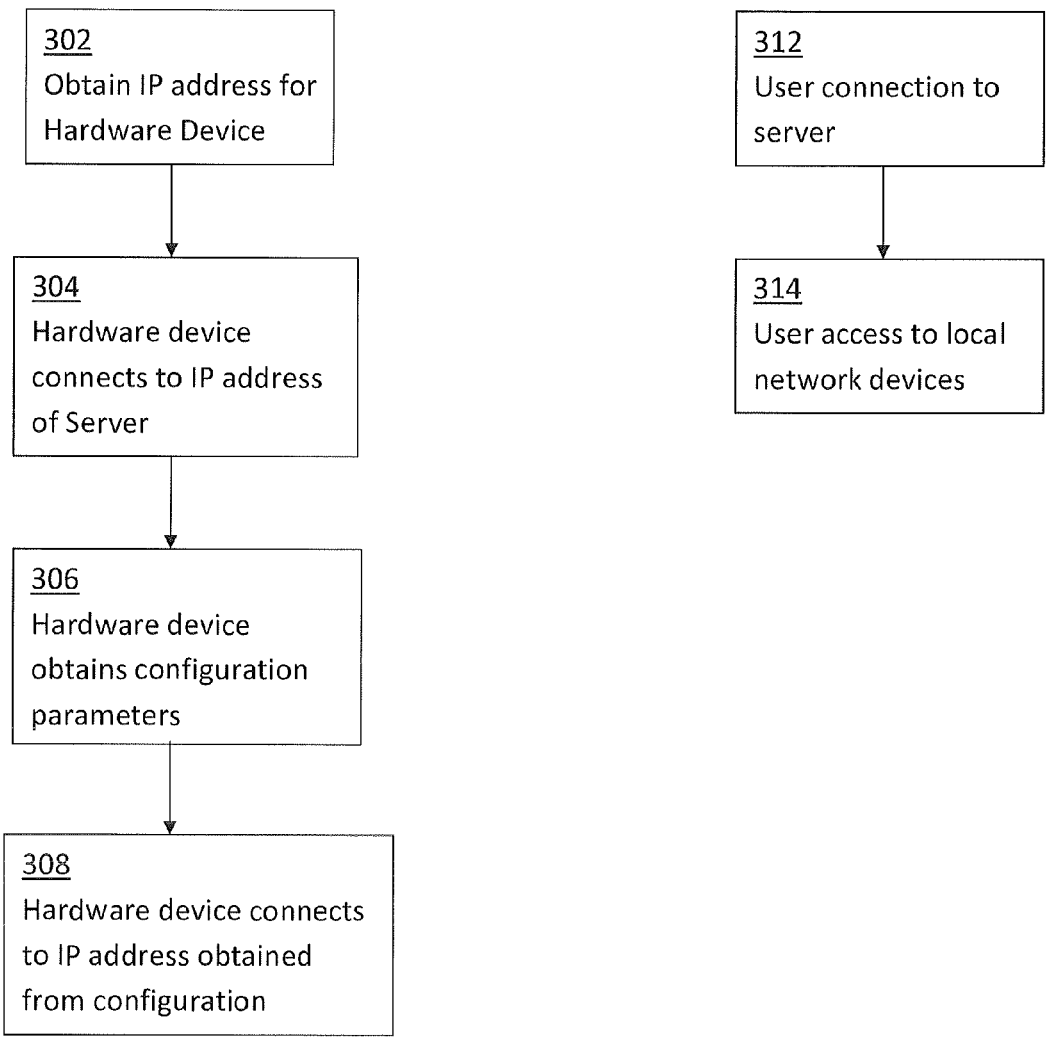
FIG. 3A-B illustrates an exemplary communication process between the hardware device, server, and an end user.

FIG. 3A illustrates an exemplary communication process between the hardware device 102 and server 106.

First, step 302, the hardware device obtains an IP address to communicate over the network. The hardware device 102 may be provided network access through a Dynamic Host Configuration Protocol ("DHCP") server to assign the device a local IP Address. Alternatively, the hardware device 102 may be preconfigured with an assigned static IP address.

Once the hardware device is assigned an IP address, step 304, the hardware device connects over the network to an identified IP address. In a preferred embodiment, the device connects over port 443 (HTTPS) to a pre-configured IP address. The pre-configured IP address directs the hardware device to a "home" location such as a host server that provides a catalog of the configuration data for each hardware device. For example, the pre-configured IP address is associated with a host server that includes the configuration parameters and certificates required for the hardware device. The device may connect over a different port, such as port 80 or a statically defined outbound network port.

The device is a "plug-and-play" device as it requires connection to a power source and the network as the only administrative set-up overhead. The device initiates a call-back routine so that it automatically attempts to connect to a pre-configured IP address, or "home". Once the connection is made, additional security may be overlaid to create a secure tunnel between the device and "home", i.e. the host server.

Once connected, step 306, the hardware device obtains the configuration parameters associated from the host server. The hardware device includes memory to store the pre-configured IP address as well as the obtained configuration parameters and certificates.

After receiving the configuration parameters, step 308, the hardware device terminates the configuration connection, and connects to the IP address of a desired server as provided in the received configuration parameters. For example, the hardware device may connect to an identified IP address over port 443 (HTTPS) to form the encrypted tunnel to the server. Once a tunnel is configured and established, an indicator light may signal to the installer that the communication connection is complete and active.

As described above, use of port 443 is preferred to create a secure and encrypted tunnel to a server using HTTPS. Alternatively, port 80 or other defined port may be used to create the connection.

FIG. 3B illustrates an exemplary communication process between the remote user 108 and the server 106 and ultimately to devices on a local network 104 through the hardware device 102.

Step 312, a user may connect to the server connected to the hardware device. The connection may be through a Windows VPN client. For example, the user may launch a web-browser and enter a URL to navigate to a web controller page. The connection may be through a PPTP VPN tunnel to provide secured access to the device. Security access controls may be incorporated into the connection to the server. For example, the host server may identify the user and controls access to any field devices before a connection is authorized. A user may alternatively use Microsoft PPTP client built into Windows to create a VPN to the hardware device through the server. A combination of connections may also be implemented, such that for example, an administrator may use the URL to create a secure tunnel, while a user attempting access to a remote device only may use the Microsoft client for simplicity.

Once a connection is established, step 314, a user may have access through the server to the devices of the local network coupled to the hardware device. Based on a user's rights, they may have network connectivity to one or more devices on a monitored local network of the hardware device. In an exemplary embodiment, a remote user may access the server, for example for administration and configuration of locations and users, through a web portal.

Figure 4:
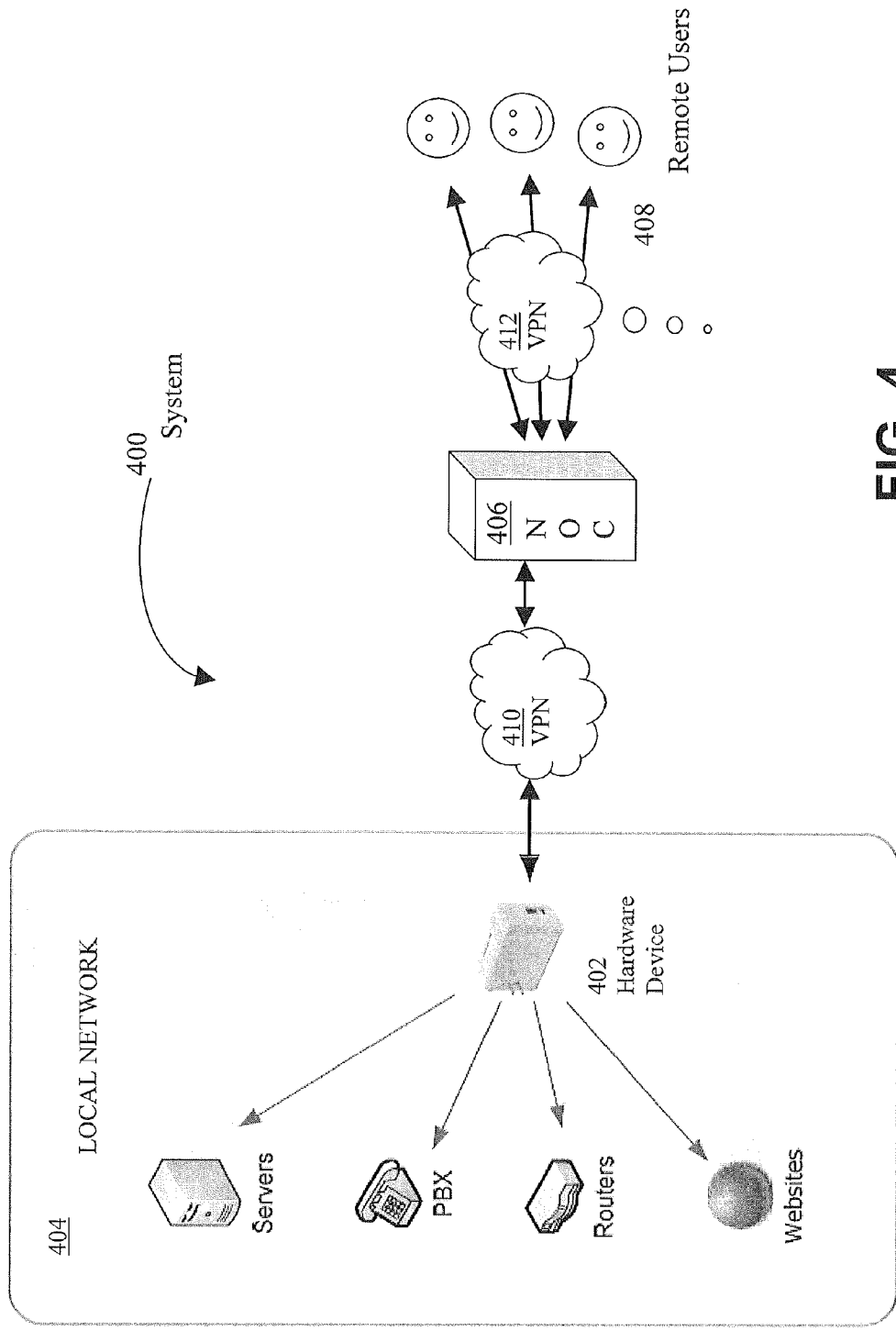
FIG. 4 illustrates an exemplary system utilizing a hardware device to connect a local network to remote users according to an embodiment of the invention.

FIG. 4 illustrates an exemplary system 400 utilizing a hardware device 402 to connect a local network 404 to remote users 408. Professional IP device monitoring and VPN access offerings may be combined to create a tool for system integrators. To further remove the administrative overhead for creating a VPN, the server may be hosted as a service. In this embodiment, the hardware device 402 is configured to call a Network Operations Center (NOC) 406 to create the secure VPN to remote users. As described above, the hardware device 402 may utilize a call-back with secure tunneling to create a VPN 410 between the local network 404 and the NOC 406 through the hardware device 402 and a server at the NOC 406. Typically, a VPN is established between a point-to-point, such that only a single user is connected. Providing the connection between the hardware device and a server permits a many-to-many connection between the devices of the local network and the remote users. Monitoring may also be provided through the NOC 406. The hardware 402 executes device monitoring tests reported to the NOC 406. Devices on the local network 404, such as cameras, DVRs, routers, switches, etc. may be tracked and tested with standard checks, including ping test. Therefore, one or more remote users 408 may then access the local network 404 and selected devices by connecting to the NOC 406 through a second VPN 412.

In this embodiment, the hardware device 402 provides access for remote users to a local network with limited network administrator involvement. To deploy, the hardware device 402 is provided power and network access. For example, the hardware device 402 may be plugged in through an AC power adapter and connected to a network through a network cable, as described above. The hardware device 402 may include an indicator to provide the status of the device. For example, once initialization is complete, an LED may light blue and pulse to indicate that the connection is complete and active. Once connected, the hardware device 402 permits access to selected devices on the local network through the NOC 406. Network administrators may then impose any access, encryption, or activity rules by accessing the NOC 406. No physical presence of the Network administrator is required at the local network. Further, no installation of software or complicated network machinery is required at the local network site. The hardware device 402 may not store passcodes or data directly on the device to reduce or limit the actual set up of the hardware on site of the local network.

A remote user 412 may access the NOC 406 through a web portal. Users and user groups may be established through the NOC 406. User profiles may be stored in secure servers at the NOC 406 to provide additional information security and provide access from any location. The user profile may define which device on the local network can be accessed by any group or individual user. Once secure user access is established, the user does not need to register for site access, but can move freely among locations. Access may be granted to a remote user from any device, such as a laptop, PC, mobile device, handheld, or other smart device supporting workplace VPN connections. To maintain security, the cross-connection from user to local network is maintained through the NOC 406. The VPN connections to and from the NOC 406 may be firewalled and transactions recorded for maintenance, review, or monitoring.

The system 400 provides firewalled VPN activity and recordable transactions. A remote user is provided access to a local network through an encrypted tunnel over port 443/tcp, with a self-signed certificate with full revoke and reissue capabilities. The access is additionally provided via RSA Key 1024 bit and MD5 hashing.

Referring to FIG. 5, the server may include one or more applications that permit a user to set desired control parameters for the local network connected through the hardware device. The control applications generally depicted in FIG. 5 may be separated into a master controller and navigator controller so that certain functions may be provided to a client as a hosted system or service, such as the system set up depicted in FIG. 4. Such an option may further reduce the administrative requirements on the person or company seeking to create remote connectivity between sites. Alternatively, the master controller and navigator controller may be combined into a single control capability so that a single user may control the parameters of the local network at a remote site, such as described in FIG. 1. The control applications assigned between the master controller and navigator controller as described below are exemplary, but may be configured in any combination to give a user the desired level of control of a remote location.

FIG. 5A, illustrates exemplary parameters that a system controller may handle at a master controller level. The master controller may include creating parameters such as customer administration, hardware controller administration, and/or hardware administration.

In an exemplary embodiment, a master controller may assign a hardware device to a specific customer. Under the Customer Administration, the customer may be assigned an identity, an account code, such as for billing, and a code key required for customer login into the hardware controller, described below.

Each hardware device may also be assigned a unique Machine Access Control (MAC) address identified directly on the device and assigned to a specific customer through the hardware administration; the services allotted to that device may also be indicated, such as whether data monitoring is to occur on the target device connected by a specific hardware device of a customer. Therefore, a service provider may track a physical hardware device to a specific customer, and turn on and off specific features associated with the hardware device.

Each client may be assigned with a host address so that when a hardware device is initiated, it obtains the location, permissions, and certificates required to connect to the desired host server. For example, the hardware device will create a secure tunnel to the master controller to obtain the required credentials to then connect to a desired client location. The host address, i.e. second address connected, may be associated through the Hardware Controller Administration. The hardware device may be configured so that whenever it is powered on, it contacts the master controller to obtain an identity, permissions, and location for final connectivity.

FIG. 5B, illustrates exemplary parameters that a local client controller may handle at a hardware device controller level. Information, configuration, installation, and/or set-up protocols, commands, instructions, etc. downloadable to the hardware device may be provided through the hardware device controller level. Various access levels and group identities may also be handled through the hardware device controller level.

In an exemplary embodiment, an administrator may set up a Hardware Controller Administration to identify the client, and provide a code key that the client may use to access the local network connection through the hardware device. One or more host sites, IP addresses, may be provided that the hardware device ultimately connects to after obtaining the location from the initial host configuration site. The hardware device may download one or more IP addresses to ultimately create the secure tunnel and provide access to users (i.e., Host Site 1 and 2).

One or more access levels may be provided to various users accessing target devices on the local network connected through the hardware device. For example, an administrator may have access to all target devices on the local network, while certain employees may have access to only limited devices. As such, various groups may be created and users assigned.

A conflict of internal addressing may occur when one or more local networks are connected together. Local network addressing of one device may duplicate another address of a second device within the architecture of the total access capability desired by the disclosed invention. Therefore, embodiments of the present invention provide for an overlay of virtual IP (VIP) addressing to handle the conflict of multiple devices. Accordingly, the server to which the device initially or ultimately connects may include a Network Addressing Translation (NAT) between a device of a local network identified through a specific hardware device and a VIP used to identify the target device external the local network. Therefore, each IP of a local network may be paired or overlaid with a corresponding VIP that is unique and addressable from external the local network. Accordingly, the hardware device controller may also permit the overlay of a VIP to an IP of a target device on the local network. Accordingly, the hardware device controller may include a NAT table to identify a specific device on the local network to a VIP addressable outside of the local network.

Various reports and logs may also be maintained at a user, group, or device level so that an administrator may determine use and activity. A users log-in and log-out time, as well as active duration, VPN port, client host, destination host, protocol, etc. may be logged, searched, reported, etc. as necessary.

The above processes may be implemented by software code written in a given programming language, hardware logic components and other electrical circuits, or some combination of both. For example, discussions of a device configured for, capable of, or programmed to perform a task may be implemented in either software, hardware, or a combination of both.

Accordingly, in an embodiment, the software used to facilitate the algorithms discussed above can be embodied onto a machine-readable medium. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; Digital VideoDisc (DVD's), EPROMs, EEPROMs, FLASH memory, magnetic or optical cards, or any type of media suitable for storing electronic instructions.

Some portions of the detailed descriptions above are presented in terms of algorithms and symbolic representations of operations on data bits within a computer's memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages. Also, an algorithm may be implemented with lines of code in software, configured logic gates in software, or a combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing," "computing," "calculating," "determining," "displaying" or the like, refer to the action and processes of a computer system, or similar electronic computing device, that manipulates and transforms data represented as physical (electronic) quantities within the computer system registers and memories into other data similarly represented as physical quantities within the computer system memories or registers, or other such information storage, transmission or display devices.

In an embodiment, the logic consists of electronic circuits that follow the rules of Boolean Logic, software that contains patterns of instructions, or any combination of both.

While some specific embodiments of the invention have been shown, the invention is not to be limited to these embodiments. For example, most functions performed by electronic hardware components may be duplicated by software emulation. Thus, a software program written to accomplish those same functions may emulate the functionality of the hardware components in input-output circuitry. The invention is to be understood as not limited by the specific embodiments described herein, but only by scope of the appended claims.

What is claimed is:

1. A method for creating a remote connection between a first device and a plurality of target devices, comprising:
    directly connecting a plug-and-play hardware device to a local network having the plurality of target devices directly connected to the local network, wherein connecting the plug-and-play hardware device includes plugging an Ethernet cable connected to the local network including the at least one target device into the plug-and-play hardware device and providing power to the plug-and-play hardware device,
    the plug-and-play hardware device automatically initiating a configuration connection to a host server by establishing a Virtual Private Network (VPN) tunnel to the host server identified by a Media Access Control (MAC) address configured into the plug-and-play hardware device;
    downloading initialization data and receiving one or more configuration parameters associated from the host server to the plug-and-play hardware device;
    unless preconfigured with an assigned static Internet Protocol (IP) address, receiving an assigned IP address based on the initialization data of the host server for handling IP addressing conflict on the local network when a plurality of non-routable IP addresses exists, the assigned IP address comprising an overlay Virtual IP (VIP) address being unique and addressable in external relation to the local network;
    terminating the configuration connection after the plug-and-play hardware device receives the one or more configuration parameters; and
    connecting the plug-and-play hardware device to a primary server accessible by the first device as provided for in the received configuration parameters to create a connection between the plug-and-play hardware device and the primary server, wherein the connection of the hardware device to the primary server is created by a Virtual Private Network (VPN) tunnel initiated by the plug-and-play hardware device to the primary server identified by a second MAC address included in the initialization data downloaded from the host server to the plug-and-play hardware device; wherein the connection of the hardware device to the primary server is initiated by the plug-and-play hardware device identified by the initialization data;
    providing access to the plurality of target devices of the local network operatively coupled to the plug-and-play hardware device through the primary server;
    entering in administrative data to the primary server including a Network Addressing Translation between an IP address of at least one target device and an associated VIP address of at least one target device;
    communicating between the first device and the at least one target device by identifying the at least one target device by the VIP address such that the at least one target device is distinguished from other devices having a same IP address.

2. The method of claim 1, wherein providing access to the plurality of target devices of the local network comprises establishing a second connection between the first device and the primary server to create a complete connection between the first device and the plurality of target devices.

3. The method of claim 2, further comprising configuring the initialization data on the host server by entering in select information to the host server.

4. The method of claim 3, wherein the select information includes a Media Access Control (MAC) address of the primary server.

5. The method of claim 3, further comprising configuring the initialization data including a Network Addressing Translation between an IP address of at least one target device and an associate VIP address of at least one target device.

6. The method of claim 5, further comprising connecting a second plug-and-play hardware device to a second local network having a second plurality of target devices connected to the second local network, connecting the second plug-and-play hardware device to the primary server to create a remote connection between the first device, the plurality of target devices and second plurality of target devices;
    wherein the second plug-and-play hardware device is configured by downloading from the host server second initialization data including a second Network Addressing Translation between a second IP address of at least another one of the plurality of second target devices and an associate second VIP address of at least another one of the plurality of second target device; and wherein the initialization data distinguishes the at least one target device and the at least another target device even when the IP address and second IP address are a same value.

7. The method of claim 3, further comprising entering in administrative data to primary server including a Network Addressing Translation between an Internet Protocol (IP) address of at least one target device and an associate Virtual IP (VIP) address of at least one target device.

8. The method of claim 1, wherein the plug-and-play hardware device automatically initiates a connection to a host server by obtaining a local IP Address from a Dynamic Host Configuration Protocol (DHCP) server and creating a secure tunnel to a pre-configured IP address of the host server over port 443.

9. The method of claim 1, wherein the initialization data downloaded from the host server to the plug-and-play hardware device includes an IP address for the primary server and certificates required for the plug-and-play hardware device to authenticate with the primary server.

10. The method of claim 1, wherein the hardware device automatically connects to the host server and then automatically disconnects from the host server and connects to the primary server after downloading initialization data.

11. A system for creating a remote connection between a first device and a plurality of target devices, comprising:
 a host server configured to store initialization data and one or more configuration parameters, wherein the host server is a Network Operations Center (NOC);
 a plug-and-play hardware device including a plurality of ports, wherein the plug-and-play hardware device is configured to locally connect to a local network including the plurality of target devices locally connected to the local network through a first port, and wherein a second port of the plug-and-play hardware device provides connectivity to one or more non-network technologies, wherein the plug-and-play hardware device includes plugging in an Ethernet cable connected to the local network including at least one target device into the plug-and-play hardware device and providing power to the plug-and-play hardware device, the plug and play hardware device programmed to:
 automatically initiate a connection to the host server by establishing a Virtual Private Network (VPN) tunnel to the host server identified by a Media Access Control (MAC) address configured into the plug-and-play hardware device and download the initialization data and configuration parameters from the host server;
 terminate the connection to the host server after the plug-and-play hardware device receives the one or more configuration parameters;
 unless preconfigured with an assigned static Internet Protocol (IP) address, receive an assigned IP address based on the initialization data of the host server for handling IP addressing conflict on the local network when a plurality of non-routable IP addresses exists, the assigned IP address comprising an overlay Virtual IP (VIP) address being unique and addressable in external relation to the local network;
 connect to an IP address of a primary server over a port based on the initialization and configuration data received from the host server, wherein the connection of the hardware device to the primary server is created by a VPN tunnel initiated by the plug-and-play hardware device to the primary server identified by a second MAC address included in the initialization data downloaded from the host server to the plug-and-play hardware device;
 enter in administrative data to the primary server including a Network Addressing Translation between an IP address of the at least one target device and an associated VIP address of the at least one target device; and
 communicate between the first device and the at least one target device by identifying the at least one target device by the VIP address such that the at least one target device is distinguished from other devices having a same IP address.

12. The system of claim 11, wherein the initialization data includes a Media Access Control (MAC) address of the primary server.

13. The system of claim 11, wherein data entered into the host server comprises the initialization data transferred to the plug-and-play hardware device, including the IP address of the primary server.

14. The system of claim 13, wherein the initialization data includes a Network Addressing Translation table between an Internet Protocol (IP) address of at least one target device and an associate Virtual IP (VIP) address of at least one target device.

15. A system for creating a remote connection between a first plurality of devices and a second plurality of target devices remote from the first plurality of devices, comprising:
 a plug-and-play hardware device including a plurality of ports, wherein the plug-and-play hardware device is separate from any of the second plurality of target devices and configured to be locally connected to a local network including the second plurality of target devices locally connected to the local network through a first port by plugging in an Ethernet cable connected to the local network including at least one of the second plurality of target device into the plug-and-play hardware device and providing power to the plug-and-play hardware device, and wherein a second port of the plug-and-play hardware device provides connectivity to one or more non-network technologies,
 unless preconfigured with an assigned static Internet Protocol (IP) address, the plug-and-play hardware device is configured to receive an assigned IP address based on the initialization data of the host server for handling IP addressing conflict on the local network when a plurality of non-routable IP addresses exists, the assigned IP address comprising an overlay Virtual IP (VIP) being unique and addressable in external relation to the local network;
 a host server, wherein the plug-and-play hardware device is configured to automatically initiate a connection to a host server remote from the local network once powered and connected to the local network and download initialization data and a plurality of configuration parameters from the host server to the plug-and-play hardware device by establishing a Virtual Private Network (VPN) tunnel to the host server identified by a Media Access Control (MAC) address configured into the plug-and-play hardware device and disconnect from the host server upon receipt of the configuration parameters;
 a primary server, wherein the plug-and-play hardware device is configured to connect to the primary server remote from the local network after the initialization data including an address of the primary server is downloaded from the host server, the primary server accessible by the plurality of first devices, wherein the connection of the plug-and-play hardware device to the primary server is created by a VPN tunnel initiated by the plug-and-play hardware device to the primary server identified by a second MAC address included in the initialization data downloaded from the host server to the plug-and-play hardware device;

a network address translation (NAT) system stored on any of the plug-and-play hardware device, host server, or primary server, which assigns a virtual address to each of the second plurality of target devices such that any of the second plurality of devices can individually be identified regardless of a physical address of the second plurality of target devices or first plurality of devices;

an administrator interface to permit entering in administrative data to the primary server including a Network Addressing Translation between an IP address of at least one target device and an associated VIP address of at least one target device; and communicate between the first device and the at least one target device by identifying the at least one target device by the VIP address such that the at least one target device is distinguished from other devices having a same IP address.

16. The system of claim 15, wherein the system comprises an administrator interface to permit an administrator to enter physical addresses and associated virtual addresses into the network address translation system, wherein the connection to the virtual server uses port 443 to establish a Virtual Private Network (VPN), the VPN is used to access the second plurality of target devices.

17. A device for facilitating remote connection between a first device and a plurality of target devices, comprising:

a plug-and-play hardware device including a plurality of ports, wherein the plug-and-play hardware device is configured to locally connect to a local network including a plurality of target devices locally connected to the local network through a first port, and wherein a second port of the plug-and-play hardware device provides connectivity to one or more non-network technologies, wherein the plug-and-play hardware device includes plugging in an Ethernet cable connected to a local network including at least one target device into the plug-and-play hardware device and providing power to the plug-and-play hardware device, the plug and play hardware device configured to:

automatically initiate a configuration connection and connect a host server on a remote network by establishing a Virtual Private Network (VPN) tunnel to the host server identified by a Media Access Control (MAC) address configured into the plug-and-play hardware device, the host server configured to store initialization and configuration data;

unless preconfigured with an assigned static Internet Protocol (IP) address, receive an assigned unique IP address based on the initialization data of the host server for handling IP addressing conflict on the local network when a plurality of non-routable IP addresses exists, the assigned IP address comprising an overlay Virtual IP (VIP) being unique and addressable in external relation to the local network;

connect a plurality of target devices on the local network;

terminate the configuration connection after receiving one or more configuration parameters;

connect the plug-and-play hardware device to a primary server based on the initialization data received from the host server to the primary server accessible by the first device as provided for in the received configuration parameters to create a connection between the plug-and-play hardware device and the primary server, wherein the connection of the hardware device to the primary server is created by a Virtual Private Network (VPN) tunnel initiated by the plug-and-play hardware device to the primary server identified by a second MAC address included in the initialization data downloaded from the host server to the plug-and-play hardware device; wherein the connection of the hardware device to the primary server is initiated by the plug-and-play hardware device identified by the initialization data;

provide access to the plurality of target devices of the local network operatively coupled to the plug-and-play hardware device through the primary server;

entering in administrative data to the primary server including a Network Addressing Translation between an IP address of at least one target device and an associated VIP address of at least one target device;

communicating between the first device and the at least one target device by identifying the at least one target device by the VIP address such that the at least one target device is distinguished from other devices having a same IP address.

* * * * *